US011047979B2

(12) United States Patent
Beers et al.

(10) Patent No.: US 11,047,979 B2
(45) Date of Patent: Jun. 29, 2021

(54) ULTRASOUND TRANSDUCER ARRAY

(71) Applicant: Sound Technology Inc., State College, PA (US)

(72) Inventors: Christopher J. Beers, Boalsburg, PA (US); Kristine Gamble, Port Matilda, PA (US)

(73) Assignee: Sound Technology Inc., State College, PA (US)

( * ) Notice: Subject to any disclaimer, the term of this patent is extended or adjusted under 35 U.S.C. 154(b) by 381 days.

(21) Appl. No.: 15/220,666

(22) Filed: Jul. 27, 2016

(65) Prior Publication Data
US 2018/0031702 A1    Feb. 1, 2018

(51) Int. Cl.
*G03B 42/06*    (2021.01)
*G01S 15/89*    (2006.01)
*G01S 7/52*    (2006.01)
*B06B 1/06*    (2006.01)
*B06B 1/02*    (2006.01)

(52) U.S. Cl.
CPC ........ *G01S 15/8915* (2013.01); *B06B 1/0292* (2013.01); *B06B 1/0622* (2013.01); *G01S 7/52079* (2013.01); *G01S 15/8927* (2013.01)

(58) Field of Classification Search
None
See application file for complete search history.

(56) References Cited

U.S. PATENT DOCUMENTS

| 3,983,529 | A | * | 9/1976 | Langlois | G01H 9/002 367/10 |
| 4,518,889 | A | * | 5/1985 | 'T Hoen | B06B 1/0648 310/334 |
| 5,460,180 | A | * | 10/1995 | Klepper | B06B 1/0622 600/447 |
| 5,517,995 | A | * | 5/1996 | Klepper | B06B 1/0629 600/437 |

(Continued)

OTHER PUBLICATIONS

MRSI—M5; Ultra-Precision Assemby Work Cell, Newport product brochure, Newport Corporation, Irving, CA (2006).

(Continued)

*Primary Examiner* — Isam A Alsomiri
*Assistant Examiner* — Jonathan D Armstrong
(74) *Attorney, Agent, or Firm* — Anthony M. Del Zoppo, III; Daugherty & Del Zoppo Co., LPA (57) ABSTRACT

A transducer array for an ultrasound imaging system includes a substrate and a single array comprising individual sub-sets of transducer elements disposed on the substrate, wherein the individual sub-sets are physically separate from each other and spatially arranged contiguous to each other. An apparatus includes a transducer array with a substrate and a single array comprising individual sub-sets of transducer elements disposed on the substrate, wherein the individual sub-sets are not in physical contact with each other and are serially arranged with respect to each other. The apparatus further includes transmit circuitry that conveys an excitation pulse to the transducer array, receive circuitry that (Continued)

receives a signal indicative of an ultrasound echo from the transducer array, and a beamformer that processes the received signal, generating ultrasound image data.

20 Claims, 7 Drawing Sheets

(56) References Cited

U.S. PATENT DOCUMENTS

| | | | |
|---|---|---|---|
| 6,110,314 A * | 8/2000 | Nix | A61B 8/12 |
| | | | 156/150 |
| 6,262,946 B1 * | 7/2001 | Khuri-Yakub | B06B 1/0292 |
| | | | 367/153 |
| 6,645,145 B1 * | 11/2003 | Dreschel | B06B 1/00 |
| | | | 600/443 |
| 6,659,954 B2 | 12/2003 | Robinson | |
| 6,842,401 B2 * | 1/2005 | Chiang | G01S 7/521 |
| | | | 367/138 |
| 6,867,535 B1 | 3/2005 | Ladabaum | |
| 7,249,513 B1 * | 7/2007 | Zipparo | B06B 1/0622 |
| | | | 310/336 |
| 7,408,283 B2 | 8/2008 | Smith | |
| 7,615,834 B2 * | 11/2009 | Khuri-Yakub et al. | |
| | | | H01L 41/113 |
| | | | 257/416 |
| 7,699,776 B2 | 4/2010 | Walker et al. | |
| 7,745,973 B2 | 6/2010 | Bayram | |
| 7,759,839 B2 | 7/2010 | Huang | |
| 8,867,314 B2 * | 10/2014 | Murakami | H04B 11/00 |
| | | | 367/137 |
| 8,926,517 B2 | 1/2015 | Huang | |
| 10,413,938 B2 * | 9/2019 | Zhao | G01S 15/895 |
| 2003/0024317 A1 * | 2/2003 | Miller | B06B 1/0292 |
| | | | 73/643 |
| 2003/0028106 A1 * | 2/2003 | Miller | B06B 1/0292 |
| | | | 600/437 |
| 2003/0085635 A1 * | 5/2003 | Davidsen | B06B 1/0607 |
| | | | 310/334 |
| 2005/0124884 A1 * | 6/2005 | Bolorforosh | A61B 8/12 |
| | | | 600/439 |
| 2005/0146247 A1 * | 7/2005 | Fisher | B06B 1/0292 |
| | | | 310/334 |
| 2005/0169107 A1 * | 8/2005 | Thomenius | B06B 1/0207 |
| | | | 367/155 |
| 2005/0200241 A1 * | 9/2005 | Degertekin | B06B 1/0292 |
| | | | 310/334 |
| 2005/0261590 A1 * | 11/2005 | Ogawa | B06B 1/0629 |
| | | | 600/459 |
| 2006/0004290 A1 * | 1/2006 | Smith | A61B 8/4483 |
| | | | 600/459 |
| 2007/0013264 A1 * | 1/2007 | Wilser | B06B 1/0292 |
| | | | 310/311 |
| 2007/0071272 A1 * | 3/2007 | Oliver | B06B 1/0292 |
| | | | 381/399 |
| 2007/0164632 A1 * | 7/2007 | Adachi | A61B 8/4483 |
| | | | 310/311 |
| 2007/0193354 A1 * | 8/2007 | Felix | B06B 1/0292 |
| | | | 73/514.32 |
| 2008/0018206 A1 * | 1/2008 | Imahashi | A61B 8/4483 |
| | | | 310/336 |
| 2008/0037808 A1 * | 2/2008 | Sawada | B06B 1/0622 |
| | | | 381/190 |
| 2008/0259725 A1 * | 10/2008 | Bayram | B06B 1/0292 |
| | | | 367/7 |
| 2008/0269614 A1 * | 10/2008 | Adachi | B06B 1/0292 |
| | | | 600/459 |
| 2011/0086443 A1 * | 4/2011 | Kobayashi | B81C 1/00214 |
| | | | 438/14 |
| 2011/0118562 A1 | 5/2011 | Smith et al. | |
| 2011/0190617 A1 * | 8/2011 | Chen | G01N 29/2418 |
| | | | 600/407 |
| 2012/0267981 A1 * | 10/2012 | Morris | A61B 8/4483 |
| | | | 310/314 |
| 2014/0125193 A1 * | 5/2014 | Chowdhury | B06B 1/0292 |
| | | | 310/300 |
| 2014/0272110 A1 * | 9/2014 | Taylor | C23C 18/1893 |
| | | | 427/9 |
| 2014/0276079 A1 * | 9/2014 | Yamagata | A61B 8/12 |
| | | | 600/459 |
| 2015/0044807 A1 * | 2/2015 | Chowdhury | B06B 1/0292 |
| | | | 438/51 |
| 2015/0290678 A1 * | 10/2015 | Chowdhury | B06B 1/0292 |
| | | | 438/51 |
| 2016/0041259 A1 * | 2/2016 | Chowdhury | G01S 7/52 |
| | | | 367/140 |
| 2017/0291192 A1 * | 10/2017 | Machida | B81B 3/00 |
| 2018/0085605 A1 * | 3/2018 | Maharbiz | A61B 8/0808 |
| 2018/0130457 A1 * | 5/2018 | Hakkens | G01N 29/262 |

OTHER PUBLICATIONS

K. Chapagain and A. Ronnekleiv, Grooved Backing Structure for CMUTs, IEEE Trans.UFFC, 60 (11), Nov. 2013.

A. Caronti et al., Curvilinear Capacitive Micromachined Ultrasonic Transducer (CMUT) Array Fabricated Using a Reverse Process, Proc. IEEE Ultrasonics Symposium, 2008.

X. Zhuang, D. Lin, O. Oralkan and B. Khuri-Yakub, Fabrication of Flexible Transducer Arrays with Through-Wafer Electrical Interconnects Based on Trench Refilling with PDMS, J Microelectromechanical Systems, 17 (2) Apr. 2008.

K. Wong, S. Panda and I. Ladabaum, Curved micromachined ultrasonic transducers, Proc. IEEE Ultrasonics Symposium 2003.

D. Zhao, S. Zhuang and R. Daigle, A Commercialized High Frequency CMUT Probe for Medical Ultrasound Imaging, Proc. IEEE Ultrasonics Symposium 2015.

Hitachi Technical Report on the development of "Mappie" CMUT Probe, Hitachi Medical Corporation, Development of Ultrasonic Transducer "MAPPIE" with CMUT Technology, 2009, http://www.hitachi-medical.co.jp/tech/medix/pdf/vol51/p31-p34.pdf; translated using Google Translate online, Nov. 23, 2015.

* cited by examiner

ULTRASOUND TRANSDUCER ARRAY

TECHNICAL FIELD

The following generally relates to ultrasound imaging and more particularly to an ultrasound imaging transducer array with individual elements and/or sub-groups of elements on a substrate rather than a fabricated entire array of physically connected elements mounted on the substrate.

BACKGROUND

Micromachined ultrasonic transducers (MUT), such as capacitive (CMUT) or piezoelectric (PMUT) types, have demonstrated performance benefits relative to traditional piezoelectric-based transducers. These benefits include increased bandwidth, which enables a wider range of imaging options such as more harmonic frequencies and improved contrast agent imaging. However, very few MUT based probes have been marketed commercially. One challenge in the production of commercial MUT probes is a performance implication of the silicon backbone. The literature has explored the inter-element acoustic crosstalk that can be supported by the rigid, continuous backbone. Some have used diced or etched grooves on the backbone or between elements to reduce crosstalk, which has been fairly effective. In another approach, a compliant substrate was fabricated in the wafer processing to decouple adjacent CMUT cells. The ideal crosstalk configuration, though, would provide complete backbone separation between elements.

Figure 1:
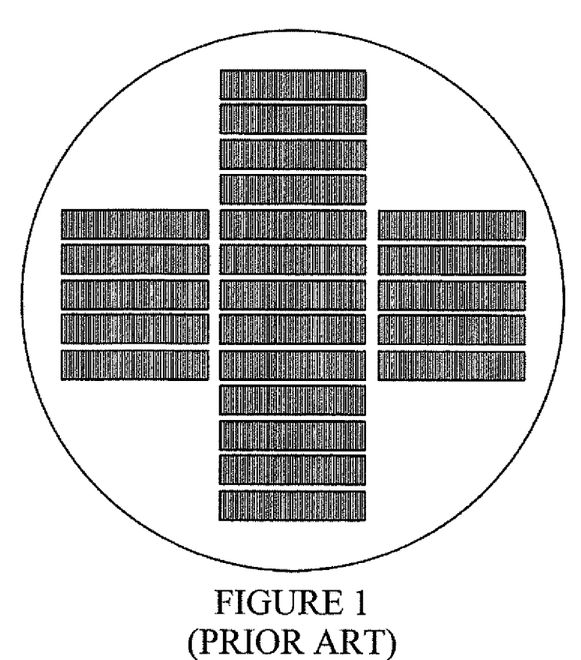
FIG. 1 schematically illustrates a prior art example of a finite number of arrays fabricated on a wafer.
Figure 2:
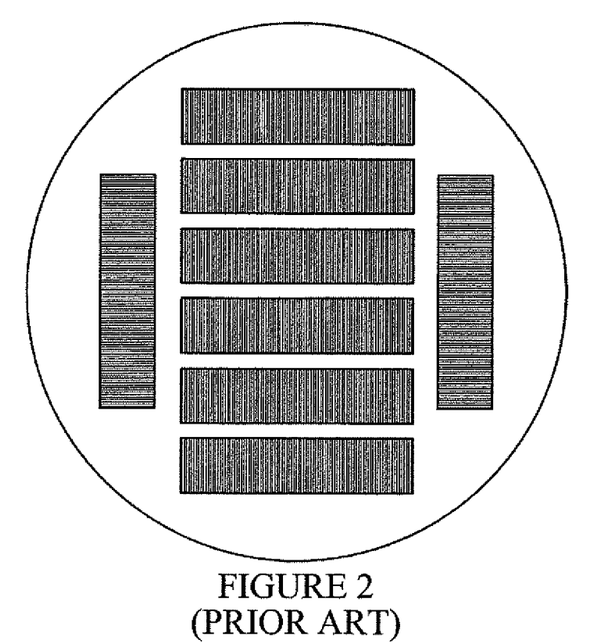
FIG. 2 schematically illustrates another prior art example of a finite number of arrays fabricated on a wafer.

Another challenge in the production of commercial MUT probes is the finite number of arrays that can be produced on each wafer. For instance, while it may be possible to fit twenty-three high-frequency linear arrays on a standard 6" wafer (FIG. 1) or eight abdominal arrays in the same circular area (FIG. 2), the fabrication cost for any one wafer is roughly the same, regardless of the number of arrays produced on the wafer. Consequently, the cost per array scales with the area of the array. Some area of the wafer remains unused because of the limit to the number of rectangles/arrays that can be fit into the circular wafer (i.e. the empty spaces in FIGS. 1 and 2). Furthermore, the yield of any individual element has consequences on the yield of the whole array. For instance, if one element has a poor etching characteristic, or if some contamination inhibits the sputtering adhesion on that element, then the entire array must be scrapped. In FIGS. 1 and 2, each rectangle is a fabricated monolithic array and include a plurality of physically connected elements, and the individual elements of an array are not physically separate and distinct components.

Another challenge in commercial production is the fabrication of curved arrays. MUT designs use a solid backbone of silicon, which prohibits curving the array in azimuth. The silicon backbone could be thinned with chemical-mechanical polishing after the top-side processing is complete, but this puts the individual elements at risk, introduces additional variability, and does not eliminate the risk that the thinned silicon backbone could still break during bending. Another approach involves etching grooves into the backbone and optionally filling them with a flexible polymer, but this approach requires complex etching and alignment between the top and bottom surfaces of the wafer, complicates handling in the pre-polymer state, and requires a non-standard polymer groove-filling application to the silicon. A reverse fabrication process has been implemented in which the silicon backbone is completely removed late in the process, which could possibly facilitate curvature after the backbone removal. However, this technique makes it impossible to test elements at the wafer-level, thereby increasing the cost of any wafer-level failures that could not be discovered until the probe assembly is nearly complete. Unfortunately, all of these approaches add wafer-level complexity and the potential for increased cost.

SUMMARY

Aspects of the application address the above matters, and others.

In one aspect, a transducer array for an ultrasound imaging system includes a substrate and a single array comprising individual sub-sets of transducer elements disposed on the substrate, wherein the individual sub-sets are physically separate from each other and spatially arranged contiguous to each other.

In another aspect, an apparatus includes a transducer array with a substrate and a single array comprising individual sub-sets of transducer elements disposed on the substrate, wherein the individual sub-sets are not in physical contact with each other and are serially arranged with respect to each other. The apparatus further includes transmit circuitry that conveys an excitation pulse to the transducer array, receive circuitry that receives a signal indicative of an ultrasound echo from the transducer array, and a beamformer that processes the received signal, generating ultrasound image data.

In another aspect, a method includes transmitting an ultrasound signal with a transducer array having a plurality of individual and physically separate elements and/or sub-groups of elements, receiving an echo signal with the transducer array, beamforming the echo signal to create an image, and displaying the image.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings, in which like references indicate similar elements and in which.

DETAILED DESCRIPTION

Figure 3:
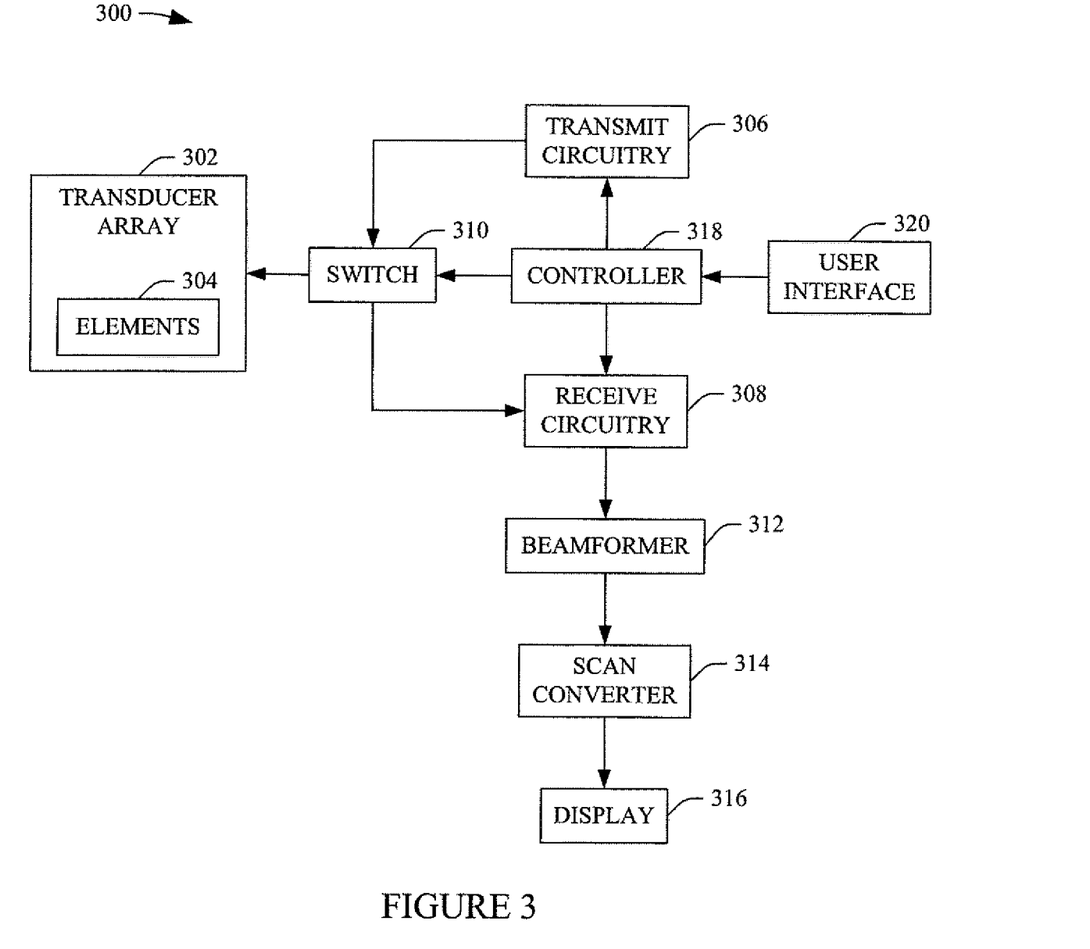
FIG. 3 schematically illustrates an example ultrasound imaging system with a transducer array including individual transducer elements and/or sub-groups of transducer elements.

FIG. 3 schematically illustrates an example ultrasound imaging system 300.

The ultrasound imaging system 300 includes a one-dimensional (1-D) or two-dimensional (2-D) transducer array 302 of transducer elements 304. The transducer elements 304 are configured to transmit ultrasound signals, receive echo signals (which are generated in response to the transmitted ultrasound signal interacting with stationary and/or flowing structure), and generate electrical signals indicative of the received signals. Example arrays include sector, linear, curved, square, rectangular, circular, irregular and/or other shaped arrays. Example elements include CMUT, PMUT, TFUT (thick-film ultrasound transducer), PZT (lead zirconate titanate), PMN-PT (lead magnesium niobium-lead titanate), PIN-PMN-PT (lead indium niobium-PMN-PT), and/or other transducer elements.

In the illustrated embodiment, the transducer elements 304 are only individual elements, only sub-groups of elements (each with two or more, but not all), or a combination of at least one individual element and at least one sub-group of elements, and are not all part of a fabricated monolithic array, such as those fabricated on wafers such as those shown in FIGS. 1 and 2. In one non-limiting instance, radiating surfaces of the elements 304 are planar on the order of ±0.015 millimeters (mm), lateral spacing of the elements 304 with respect to each other and along an array direction (azimuth) is on the order of ±0.015 mm, and/or consistency along element direction (elevation) is on the order of ±0.05 mm. Other surfaces, lateral spacing and/or consistency are contemplated herein.

Non-limiting examples of the transducer array 302 are described in connection with FIGS. 4 and 5 for linear arrays and FIGS. 6 and 7 for curved arrays. Other array configurations are contemplated herein.

Figure 4:
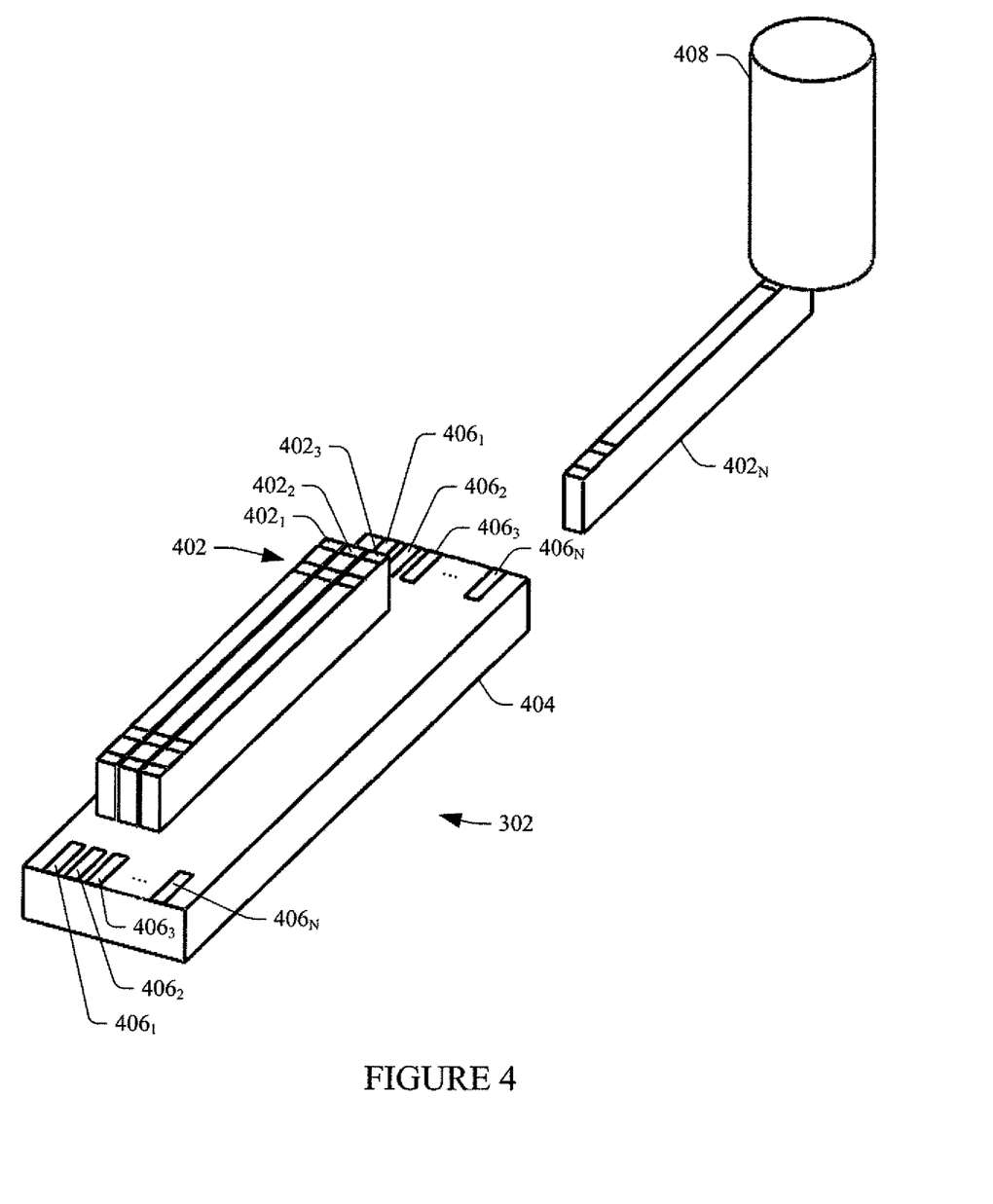
FIG. 4 schematically illustrates an example linear array with individual transducer elements and/or sub-groups of transducer elements thereon.

FIG. 4 depicts an example in which element $402_1$, $402_2$, $402_3$, ..., $402_N$ (where N is a positive integer), collectively referred to herein as elements 402, are disposed on a (rigid or flexible) substrate 404, which includes pairs of electrical traces $406_1$, $406_2$, $406_3$, ..., $406_N$, one pair for each element. Each element 402 is electrically coupled to a corresponding pair of traces via a wire, etc. The substrate 404 is configured to include predetermined acoustic properties, e.g., to mitigate any reflections and/or suppress any vibrational modes (e.g., Lamb waves) that could couple into it from the element vibration. Alternately, the substrate 404 consists of integrated circuits (e.g., for signal conditioning and/or processing) that could have exposed attachment pads.

An electro-mechanical machine 408 (or alternatively, tweezers) is shown placing the element $402_N$ on the substrate 404. For example, after the elements 406 are cut out of a wafer, each element 402 is individually and independently (with respect to the other element(s)) picked up and placed on the substrate 404 (i.e. into the array 302) using known technology. In this instance, each of the elements 402 is not physically connected to another element(s) 402 or fabricated on a same wafer with another element(s) 402. For example, each of the elements 402 is only physically connected to the substrate 404, with the exception of wires, active and/or passive components, etc., if any. The elements 402 are attached to the substrate 404 using an adhesive, solder, and/or other bonding mechanism.

In the illustrated example, the elements $402_1$, $402_2$, and $402_3$ are individual elements disposed on the substrate 404 (e.g., similar to the element $402_N$) and with a separation there between on the order of ±0.015 mm. In a variation, the sub-group of elements $402_1$ and $402_2$ or the sub-group of elements $402_1$, $402_2$, and $402_3$ are fabricated on and as part of a single unity sub-array and the sub-array (and not individual elements) is disposed on the substrate 404. For example, the sub-group of elements $402_1$ and $402_2$ or the sub-group of elements $402_1$, $402_2$, and $402_3$ could be individual sub-arrays formed on a wafer. With this configuration, the sub-group of elements $402_1$ and $402_2$ or the sub-group of elements $402_1$, $402_2$, and $402_3$ are physically connected to each other, and neither the elements $402_1$ and $402_2$ nor the elements $402_1$, $402_2$, and $402_3$ are physically connected to the element $402_N$.

Figure 5:
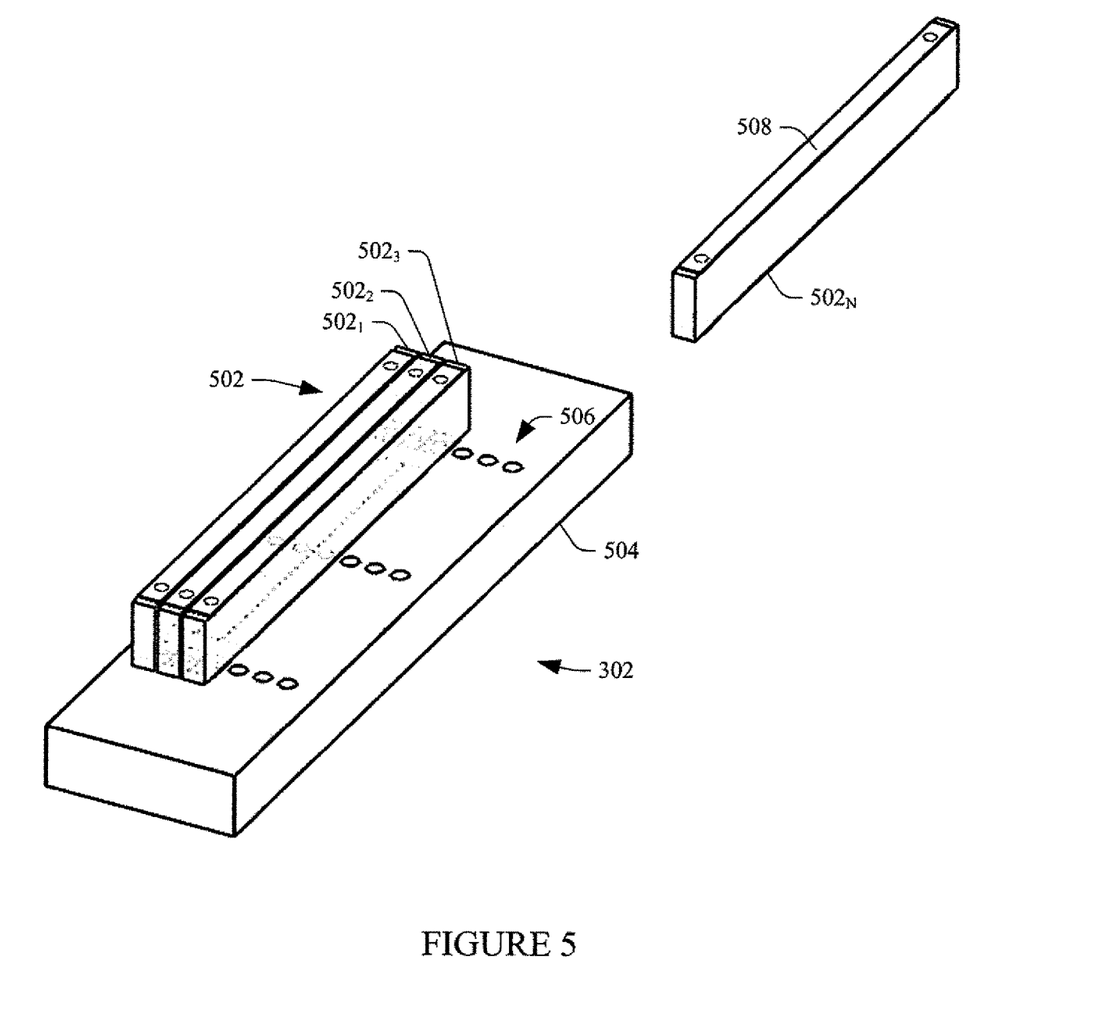
FIG. 5 schematically illustrates another example linear array with individual transducer elements and/or sub-groups of transducer elements thereon.

FIG. 5 depicts an example in which elements $502_1$, $502_2$, $502_3$, ..., $502_N$ (collectively referred to herein as elements 502) are disposed on a substrate 504. The substrate 504 includes a plurality of electrical interconnects 506 embedded in the substrate 504. Each of the elements $502_1$, $502_2$, $502_3$, ..., $502_N$ includes one or more electrical connections 508 through a thickness dimension of the element instead of from a top surface of the element (e.g., a through-silicon vias (TSV's) where the material is silicon, etc.) through which electrical signals are transferred from a respective one of the elements $502_1$, $502_2$, $502_3$, ..., $502_N$ to the substrate 504. Similar to the configuration described in FIG. 4, a machine, etc. can place the individual elements 502 on the substrate 504, and the elements $502_1$, $502_2$, and $502_3$ are individually and independently disposed on the substrate 504, or the elements $502_1$ and $502_2$ or the elements $502_1$, $502_2$, and $502_3$ are part of a single unity piece disposed on the substrate 504.

Figure 6:
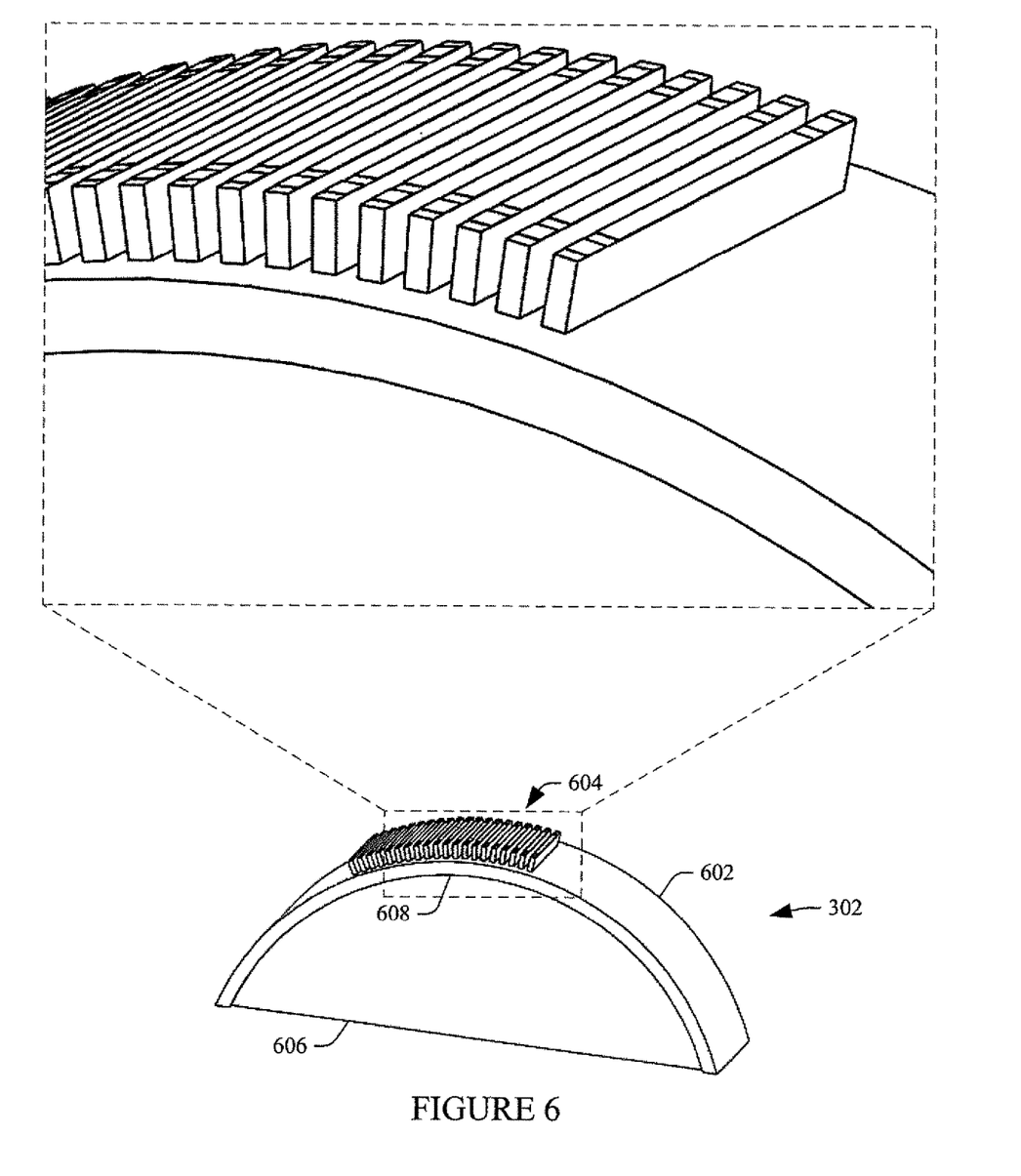
FIG. 6 schematically illustrates an example curved array with individual transducer elements and/or sub-groups of transducer elements on a flexible substrate disposed on a curved backbone.

FIG. 6 depicts an example in which a flexible substrate 602 with elements 604 is disposed on a backing 606 having a rigid curved surface 608. In one instance, the elements 604 are disposed individually on the flexible substrate 602 while the flexible substrate 602 is flat, e.g., similar to the element $402_N$ of FIG. 4. In another instance, the elements 604 are disposed on the flexible substrate 602 while the flexible substrate 602 is flexed. For example, the flexible substrate 602 can first be flexed around and/or disposed on the rigid curved surface 608, and then the elements 604 can be disposed on the flexible substrate 602. Likewise, a machine, etc. can place the elements 604, and the elements 604 are individually and/or group-wise placed on the flexible substrate 602.

Figure 7:
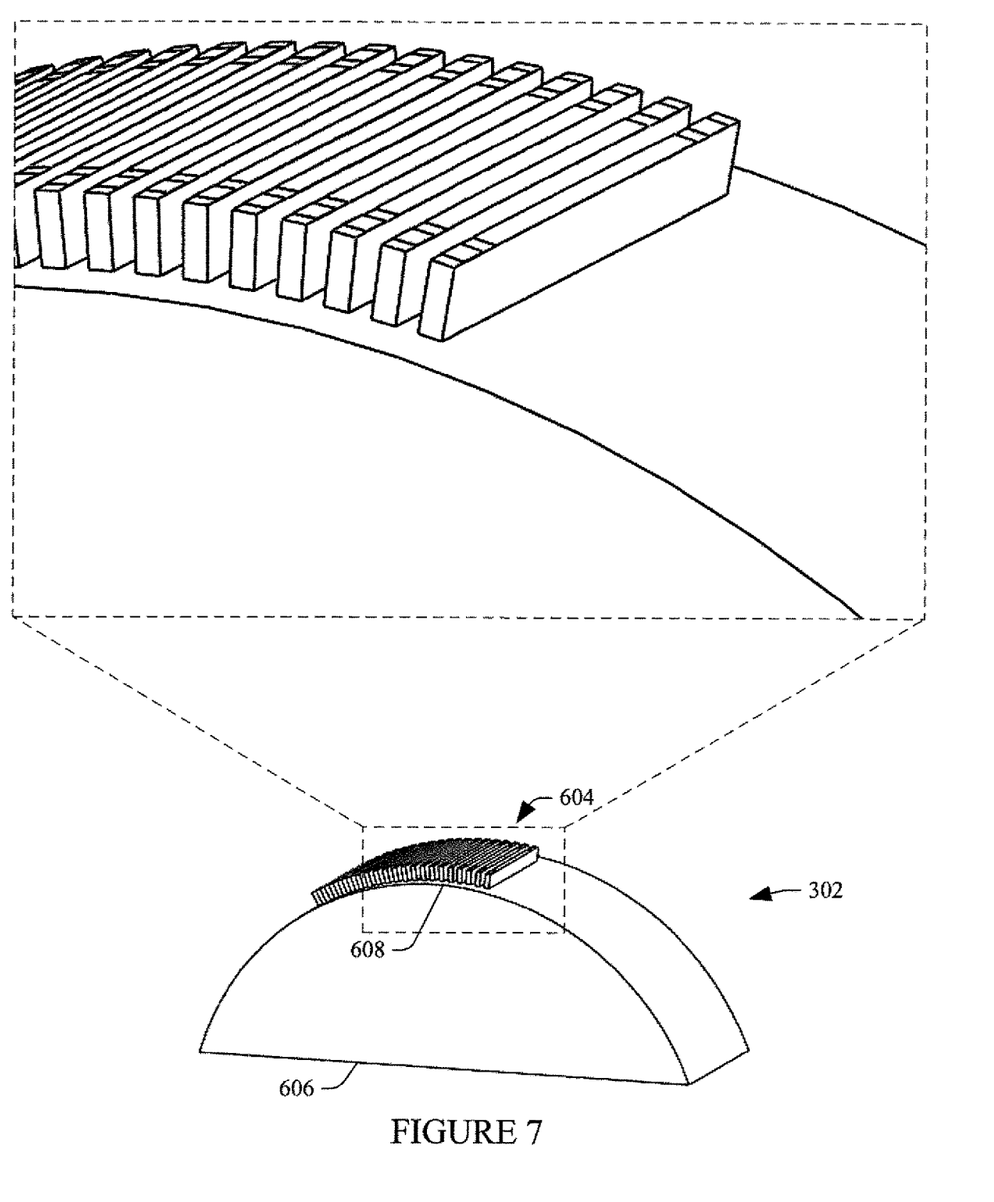
FIG. 7 schematically illustrates an example curved array with individual transducer elements and/or sub-groups of transducer elements disposed directly on the curved backbone.

FIG. 7 depicts the array in FIG. 6 except that the flexible substrate 602 is omitted, and the elements 604 are individually disposed directly on the curved backing 606. In this instance, the curved backing 606 serves as a substrate. Likewise, a machine, etc. can place the elements 604, and the elements 604 are individually and/or group-wise placed on the backing 606.

Figure 8:
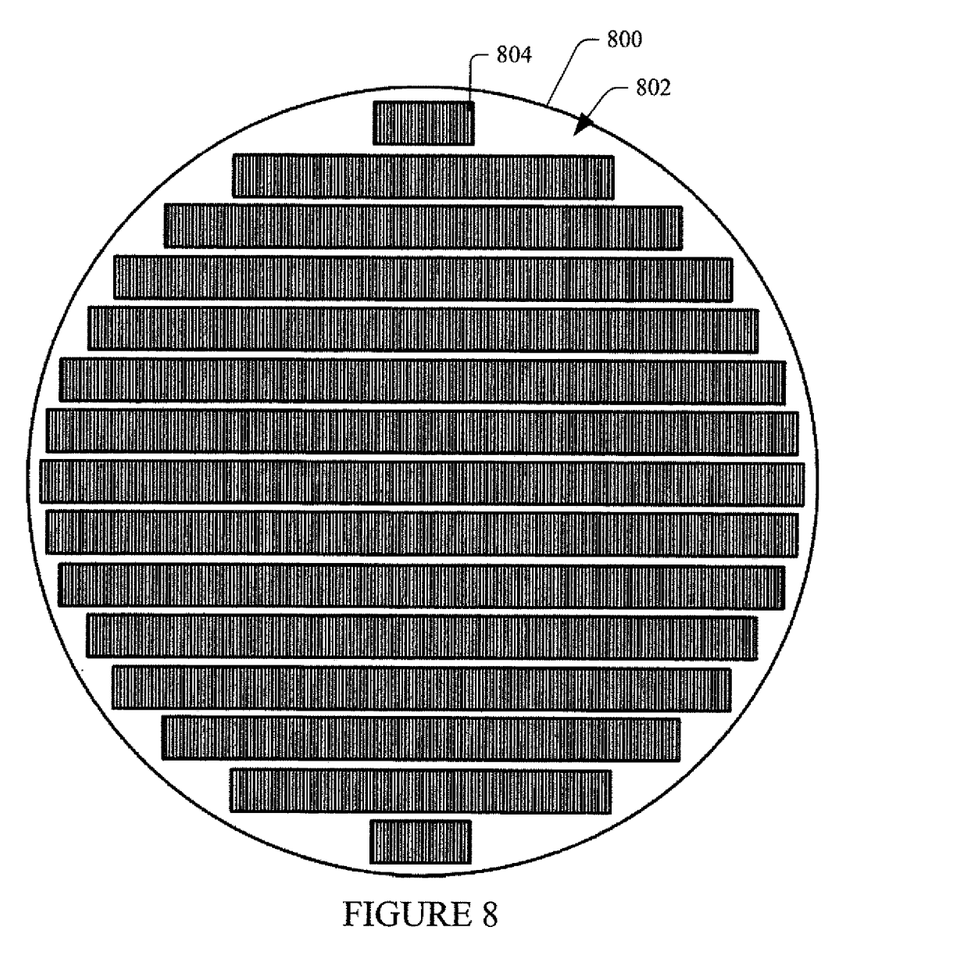
FIG. 8 schematically illustrates a wafer with a plurality of rows of individual elements.

For the approached described herein, the individual and/or sub-groups of elements (and not the entire array 302) are first fabricated in a wafer, then individually separated (e.g., etched, diced, etc.) from the wafer, and subsequently assembled individually into the transducer array 302. Relative to a configuration (e.g., FIGS. 1 and 2) in which entire arrays are fabricated on a wafer, the approach described herein enables increased wafer area utilization optimizing cost per element, increased array geometry flexibility (e.g., elements can be assembled into curved transducers without additional wafer-level complexity), and/or a reduction of acoustic cross-talk, e.g., by the elimination of a common backbone. FIG. 8 depicts an example wafer 800 with a plurality of rows 802 of individual and/or groups of fabricated transducer elements 804, and not complete arrays.

Returning to FIG. 3, transmit circuitry 306 generates pulses that excite a predetermined set of the elements to transmit the ultrasound signals. Receive circuitry 308 receives the electrical signals. In one instance, the receive circuitry 308 is configured to pre-process the received signals, e.g., by amplifying, digitizing, etc. the signals. A switch 310 switches between the transmit and receive circuitry 306 and 308, depending on whether the transducer array 302 is in transmit or receive mode. A beamformer 312 processes the received signals, for example, by applying time delays and weights, summing, and/or otherwise processing the received signal. Other processing is also contemplated herein.

A scan converter 314 scan converts the beamformed data, converting the beamformed data into the coordinate system of a display 316, which visually displays the images. The data can be visually displayed in a graphical user interface (GUI), which allows the user to selectively rotate, scale, and/or manipulate the displayed data through a mouse, a keyboard, touch-screen controls, etc. A controller 318 controls one or more of the components of the system 300, e.g., based on a mode of operation (e.g., B-mode, etc.). A user interface 320 includes an input device (e.g., a physical control, a touch-sensitive surface, etc.) and/or an output device (e.g., a display screen, etc.). A mode, scanning, and/or other function can be activated by a signal indicative of input from the user interface 320.

In one instance, the transducer array 302 is part of a probe and the transmit circuitry 306, the receive circuitry 308, the switch 310, the beamformer 312, the scan converter 314, the controller 318, the user interface 320, and the display 316 are part of a console. Communication there between can be through a wired (e.g., a cable and electro-mechanical interfaces) and/or wireless communication channel. In this instance, the console can be a portable computer such as a laptop, a notebook, etc., with additional hardware and/or software for ultrasound imaging. The console can be docked to a docketing station and used.

Alternatively, the console can be part (fixed or removable) of a mobile or portable cart system with wheels, casters, rollers, or the like, which can be moved around. In this instance, the display 316 may be separate from the console and connected thereto through a wired and/or wireless communication channel. Where the cart includes a docking interface, the console can be interfaced with the cart and used. An example of such a system is described in US publication 2011/0118562 A1, entitled "Portable ultrasound scanner," and filed on Nov. 17, 2009, which is incorporated herein in its entirety by reference.

Alternatively, the transducer array 302, the transmit circuitry 306, the receive circuitry 308, the switch 310, the beamformer 312, the scan converter 314, the controller 318, the user interface 320, and the display 316 are all housed by and enclosed within a hand-held ultrasound apparatus, with a housing that mechanically supports and/or shields the components within. An example of a hand-held device is described in U.S. Pat. No. 7,699,776, entitled "Intuitive Ultrasonic Imaging System and Related Method Thereof," and filed on Mar. 6, 2003, which is incorporated herein in its entirety by reference.

The transducer array 302 described herein can have alternating high- and low-frequency elements (e.g., odd elements are low frequency, even elements are high frequency). Such a design could enhance tissue harmonic imaging (transmit primarily on low-frequency elements, receive primarily on high-frequency elements) and/or improve image quality through the entire depth (use smaller-elevation high-frequency elements for shallow imaging and large-elevation low-frequency elements for deep imaging).

Furthermore, the surface profile of the elements can be varied across elevation by depositing multiple rows of varying thicknesses. This allows for elevation focusing, which is difficult to do on a basically planar piece of silicon. Furthermore, elements from varying sizes, shapes, and/or compositions can be assembled. For instance, the array 302 can have alternating CMUT and PZT elements, e.g., where the PZT elements are used for transmit and the CMUT elements for receive. This arrangement would be very difficult without the fine-scale assembly approach described herein.

The element and/or group-wise construction described herein is compatible with a wide variety of cell designs (e.g., square, hexagonal, circular, extra membrane mass, non-flat surfaces, etc.), element designs (e.g., multi-frequency, apodization, patterned electrodes, etc.), wafer processing techniques (e.g., sacrificial release, wafer bonding, etc.), and/or interconnect configurations (e.g., top surface only for wire bonding or other attachment, through-silicon vias, trench connections, etc.). Generally, the element and/or group-wise construction described herein is independent of the specific design of the transducer element 304.

Figure 9:
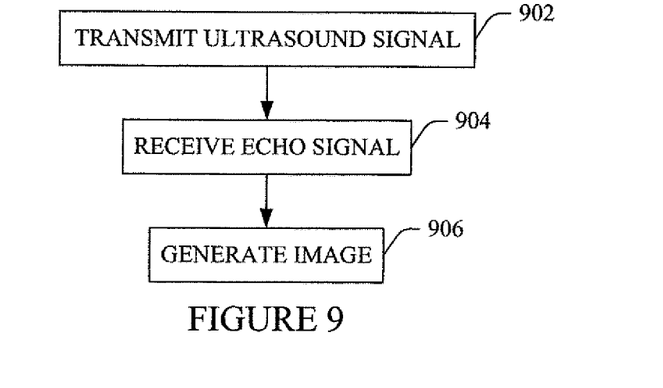
FIG. 9 illustrates an example method in accordance with an embodiment herein.

FIG. 9 illustrates an example method. At 902, an ultrasound signal is transmitted via a transducer array that includes a plurality of individual elements (i.e., elements not part of a common substrate) and/or a plurality of sub-groups of elements (i.e., each sub-group is part of a common substrate, and the different sub-groups are part of different substrates). At 904, an echo signal is received via the transducer array. At 906, the echo signal is processed to produce an image.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:
1. A transducer array for an ultrasound imaging system, the transducer array comprising:
   a substrate; and
   a single array comprising separate and individual sub-sets of transducer elements disposed on the substrate,
   wherein a first sub-set of the separate and individual sub-sets includes a first side,
   wherein a second sub-set of the separate and individual sub-sets includes a second side,
   wherein the first and second separate and individual sub-sets are neighboring sub-sets,
   wherein the first and second sides face each other,
   wherein entireties of the first and second sides are physically separate from and do not physically contact each other,
   wherein the separate and individual sub-sets are not part of a fabricated monolithic array,
   wherein the separate and individual sub-sets are individually and independently, with respect to each other, placed on the substrate and spatially arranged contigu- ous to each other with a non-zero gap between neighboring sub-sets of the separate and individual sub-sets, and wherein radiating surfaces of at least one pair of neighboring separate and individual sub-sets of transducer elements are planar on an order of ±0.015 millimeters.

2. The transducer array of claim 1, wherein the substrate is a linear substrate, and each of the individual sub-sets of transducer elements includes only a single transducer element.

3. The transducer array of claim 1, wherein the substrate is a linear substrate, and each of the individual sub-sets of transducer elements includes two or more elements physically part of a same layer.

4. The transducer array of claim 1, wherein the substrate is a linear substrate, and the individual sets of transducer elements includes a first set with only a single transducer element and a second set with two or more elements physically part of a same layer.

5. The transducer array of claim 1, wherein the substrate is a flexible substrate, and each of the individual sub-sets of transducer elements includes only a single transducer element, and further comprising:

a curved backing, wherein the flexible substrate is disposed on the curved backing.

6. The transducer array of claim 1, wherein the substrate is a flexible substrate, and each of the individual sub-sets of transducer elements includes two or more elements physically part of a same layer, and further comprising:

a curved backing, wherein the flexible substrate is disposed on the curved backing.

7. The transducer array of claim 1, wherein the substrate is a flexible substrate, and the individual sets of transducer elements includes a first set with only a single transducer element and a second set with two or more elements physically part of a same layer, and further comprising:

a curved backing, wherein the flexible substrate is disposed on the curved backing.

8. The transducer array of claim 1, wherein the substrate is a curved backing, and each of the individual sub-sets of transducer elements includes only a single transducer element.

9. The transducer array of claim 1, wherein the substrate is a curved backing, and each of the individual sub-sets of transducer elements includes two or more elements physically part of a same layer.

10. The transducer array of claim 1, wherein the substrate is a curved backing, and the individual sets of transducer elements includes a first set with only a single transducer element and a second set with two or more elements physically part of a same layer.

11. The transducer array of claim 1, wherein the substrate includes interconnect traces, and the individual sets of transducer elements are electrically connected to the interconnect traces through wires.

12. The transducer array of claim 1, wherein the substrate includes embedded interconnects, and the individual sets of transducer elements include electrical connections through thicknesses of the elements, and the electrical connections are electrically connected to the embedded interconnects.

13. An apparatus, comprising:

a transducer array, including:

a substrate with a flat surface; and a single array comprising separate and individual sub-sets of transducer elements separately attached on the flat surface, wherein entireties of the separate and individual sub-sets are not in physical contact with each other before and after being attached to the flat surface and are serially arranged with respect to each other on the flat surface with a non-zero gap of flat surface between neighboring sub-sets, wherein at least one of the transducer elements is one of a capacitive micromachined ultrasonic, a thick-film ultrasonic, a lead zirconate titanate, a lead magnesium niobium-lead titanate, or a lead indium niobium-magnesium niobium-lead titanate element, and a consistency along an elevation direction is on an order of ±0.05 mm;

transmit circuitry that conveys an excitation pulse to the transducer array;

receive circuitry that receives a signal indicative of an ultrasound echo from the transducer array; and a beamformer that processes the received signal, generating ultrasound image data.

14. The apparatus of claim 13, wherein a lateral spacing between the individual sets of transducer elements is on an order of ±0.015 millimeters.

15. The apparatus of claim 13, wherein at least two of the transducer elements are a different type of element and from a group consisting of a capacitive micromachined ultrasonic, a piezoelectric micromachined ultrasonic, a thick-film ultrasonic, a lead zirconate titanate, a lead magnesium niobium-lead titanate, or a lead indium niobium-magnesium niobium-lead titanate types of elements.

16. The apparatus of claim 13, wherein the single array includes alternating high-frequency and low-frequency elements.

17. The apparatus of claim 13, wherein at least two of the elements have a different geometry.

18. The transducer array of claim 1, wherein the non-zero gap is on an order of ±0.015 millimeters.

19. The transducer array of claim 1, wherein a consistency along an elevation direction is on an order of ±0.05 mm.

20. The apparatus of claim 13, wherein radiating surfaces of at least one pair of neighboring separate and individual sub-sets of transducer elements are planar on an order of ±0.015 millimeters.

* * * * *